United States Patent
Teo et al.

(10) Patent No.: US 8,208,224 B1
(45) Date of Patent: Jun. 26, 2012

(54) SUSPENSION ASSEMBLIES FOR MINIMIZING STRESS ON SLIDER SOLDER JOINTS

(75) Inventors: Kia Moh Teo, San Jose, CA (US); Yanning Liu, San Ramon, CA (US); Wing C. Shum, San Mateo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/220,508

(22) Filed: Aug. 29, 2011

(51) Int. Cl.
 *G11B 5/48* (2006.01)
(52) U.S. Cl. .................................... 360/245.3
(58) Field of Classification Search ............. 360/245.3, 360/244.2, 234.3, 235.4, 294.4, 234.6, 245.4, 360/245.7, 245.8, 245.9, 245
See application file for complete search history.

(56) References Cited

U.S. PATENT DOCUMENTS

| | | | |
|---|---|---|---|
| 6,459,549 B1 | 10/2002 | Tsuchiya et al. | |
| 6,515,832 B1 | 2/2003 | Girard | |
| 6,965,499 B1 | 11/2005 | Zhang et al. | |
| 6,965,501 B1 * | 11/2005 | Pan et al. ................... | 360/245.7 |
| 6,993,824 B2 | 2/2006 | Childers et al. | |
| 7,002,780 B2 | 2/2006 | Rancour et al. | |
| 7,113,372 B2 | 9/2006 | Segar et al. | |
| 7,137,187 B2 * | 11/2006 | Pan et al. ................... | 29/603.03 |
| 7,403,357 B1 | 7/2008 | Williams | |
| 7,411,764 B2 | 8/2008 | Yang et al. | |
| 7,525,769 B2 | 4/2009 | Yao et al. | |
| 7,545,605 B2 | 6/2009 | Hagiya et al. | |
| 7,554,773 B2 | 6/2009 | Zhu et al. | |
| 7,567,410 B1 | 7/2009 | Zhang et al. | |
| 7,593,190 B1 | 9/2009 | Thornton et al. | |
| 7,663,843 B2 | 2/2010 | Yao | |
| 7,688,553 B1 * | 3/2010 | Williams et al. ............ | 360/245.3 |
| 7,697,237 B1 | 4/2010 | Danielson | |
| 2004/0027725 A1 * | 2/2004 | Pan et al. ................... | 360/245.3 |
| 2004/0226164 A1 | 11/2004 | Girard | |
| 2006/0262456 A1 | 11/2006 | Wang et al. | |
| 2008/0144223 A1 | 6/2008 | Muraki et al. | |
| 2008/0144225 A1 | 6/2008 | Yao et al. | |
| 2008/0180850 A1 | 7/2008 | Rice et al. | |

* cited by examiner

*Primary Examiner* — Allen Cao

(57) ABSTRACT

Suspension assemblies for minimizing stress on slider solder joints in a disk drive are described. One such suspension assembly includes a flexure including a gimbal area having a leading end and a trailing end, a metal support layer including a flexure tongue, a flexure tip disposed at the trailing end and including first and second isolation arms extending from the flexure tongue, and a bond pad support including a support arm extending from the flexure tongue, and a load beam including an elongated flat surface having a protrusion extending therefrom and having a cut-out section, where the leading end of the flexure gimbal area is attached along the flat surface, where the flexure is configured to retain contact with the protrusion, and where the cut-out section is configured to receive a portion of the bond pad support when the flexure rotates about a long axis of the suspension assembly.

17 Claims, 5 Drawing Sheets

SUSPENSION ASSEMBLIES FOR MINIMIZING STRESS ON SLIDER SOLDER JOINTS

FIELD

The present invention relates generally to the field of disk drives, and more particularly to suspension assemblies for minimizing stress on slider solder joints in a disk drive.

BACKGROUND

Disk drives store and retrieve data for digital electronic devices such as computers. A typical magnetic disk drive has a head, including a slider and a transducer, in very close proximity to a surface of a rotatable magnetic disk. The transducer generally includes a write element and/or a read element. As the magnetic disk rotates beneath the head, a very thin air bearing is formed between the surface of the magnetic disk and an air bearing surface of the slider. The write element and the read element can be alternately employed to write and read data while an actuator assembly positions the heads along desired magnetic "tracks" on the magnetic disk.

In order to keep the head properly oriented and at the correct height above the disk while in flight, disk drives employ a head gimbal assembly (HGA) that includes the head and a suspension that further includes a load beam and a flexure that supports the head. The flexure is attached to the load beam at one or more points but the distal end of the flexure is often unattached to allow the head on the flexure to roll (e.g., like an airplane) along a long axis of the suspension. To enable the rolling motion of the head, a protrusion from the load beam can make contact with a backside of the flexure at about a central area of the slider.

The typical flexure is a layered structure that includes a thin metal support layer, electrical traces, and an insulating layer to keep the electrical traces from contacting the metal support or each other. To electrically connect the head to the electrical traces during assembly, bonding pads of the head's transducer (e.g., slider) are soldered to corresponding termination pads of the electrical traces on the flexure. With increasing HGA complexity and the number of electrical connections to the head to enable slider recording technology within current slider form factors, the solder size is typically required to be miniaturized to pack many solder joints on the head without bridging between solder joints. However, as the solder gets smaller, it becomes more susceptible to mechanical stress and may crack if the stress is beyond the solder joint strength. In some cases, the stress and/or cracking in a solder joint can result in catastrophic connectivity failure within the disk drive.

At times, a disk drive will experience undesirable and violent non-operational shock that might be the result of sudden movement of the disk drive. As a result, the free end of the flexure may swing towards the load beam and a backside area of the flexure opposite the slider solder bonds may make forceful contact with the load beam. In such case, the solder joints on the slider may crack thereby resulting in a weakened or non-functional joint. A similar problem can occur during the roll operation when the flexure backside opposite the slider solder bonds makes contact with the load beam. As such, improved suspension assemblies for minimizing stress on the slider solder joints are needed.

SUMMARY

Aspects of the invention relate to suspension assemblies for minimizing stress on slider solder joints in a disk drive. In one embodiment, the invention relates to a suspension assembly for a magnetic read/write head of a storage device, the suspension assembly including a flexure including a gimbal area having a leading end and a trailing end, a metal support layer in the gimbal area, the metal support layer including a flexure tongue, a flexure tip disposed at the trailing end and including first and second isolation arms extending from the flexure tongue, and a bond pad support section including at least one support arm extending from the flexure tongue, and a load beam including an elongated flat surface having a protrusion extending therefrom and having at least one cut-out section, where the leading end of the gimbal area of the flexure is attached along the elongated flat surface of the load beam, where the flexure is configured to retain contact with the protrusion, and where the at least one cut-out section is configured to receive a portion of the bond pad support section when the flexure rotates about a long axis of the suspension assembly.

DETAILED DESCRIPTION

Figure 1:
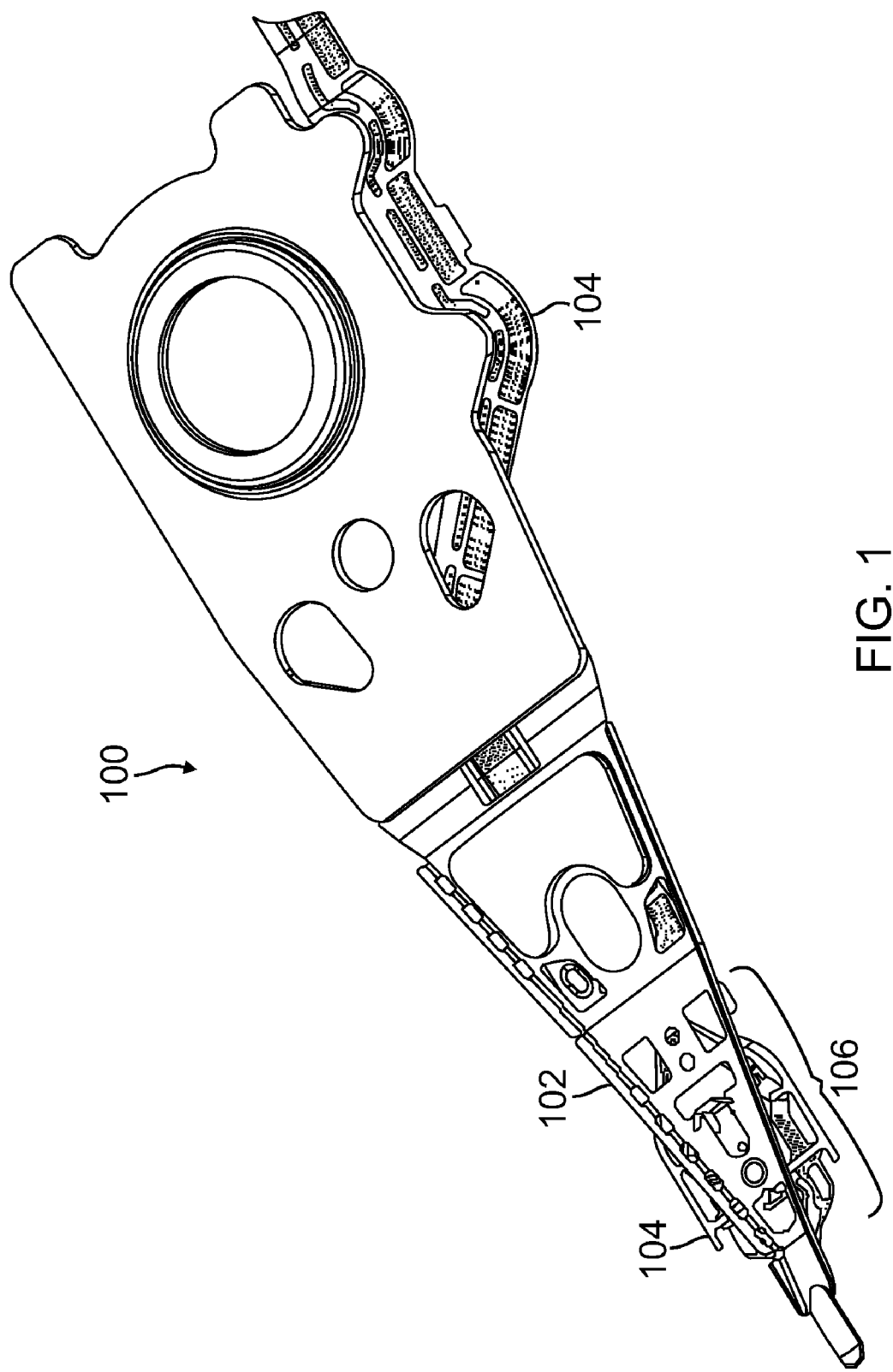
FIG. 1 is a perspective view of a hard drive suspension assembly including a load beam coupled to a flexure for supporting a slider at a gimbal area of the suspension in accordance with one embodiment of the invention.

Referring now to the drawings, embodiments of suspension assemblies including features for minimizing stress on slider solder joints in a disk drive are illustrated. The suspension assemblies include a load beam and a flexure, where the flexure has a metal support layer with a flexure tongue and a flexure tip having isolation arms extending away from the flexure tongue such that when the flexure tip makes contact with the load beam, the disruption caused to the solder/bond pad support, which is adjacent to the isolation arms, is minimized or eliminated. As such, during a non-operational shock type event which may be caused by sudden movement of a drive, the flexure may make contact with the load beam without damaging the solder joints to a slider mounted to the flexure.

The load beams include one or more cut-out sections positioned to correspond to a backside of the flexure at the point where the solder pads are located. The cut-out sections are configured such that during slider roll, where the flexure may twist substantially along a long axis of the suspension, the solder pad backside of the flexure does not make contact with the load beam. Instead, another point on the flexure makes contact with the load beam and the slider solder joints get reduced or minimal stress from the impact forces. Similarly, the cut-outs can reduce or minimize stress on the solder joints during non-operation shock when the flexure makes forceful contact with the load beam in a direct motion (e.g., vertical or upwards motion) rather than a twisting motion as during the slider roll.

The flexure also includes traces that extend to and contact each of the solder pads. In some embodiments, the terminal segment of at least some of the flexure traces can be made to form an acute angle with respect to a long axis of the respective solder pad. In such case, the acute angled traces can also minimize stress on the solder pads during operational twisting/rolling or non-operational shock type events.

FIG. 1 is a perspective view of a hard drive suspension assembly 100 including a load beam 102 coupled to a flexure 104 for supporting a slider (not visible) at a gimbal area 106 of the suspension 100 in accordance with one embodiment of the invention. The suspension assembly 100 supports and suspends the slider (not visible in FIG. 1 but see FIG. 5) above a rotating magnetic media disk (not shown).

Figure 2:
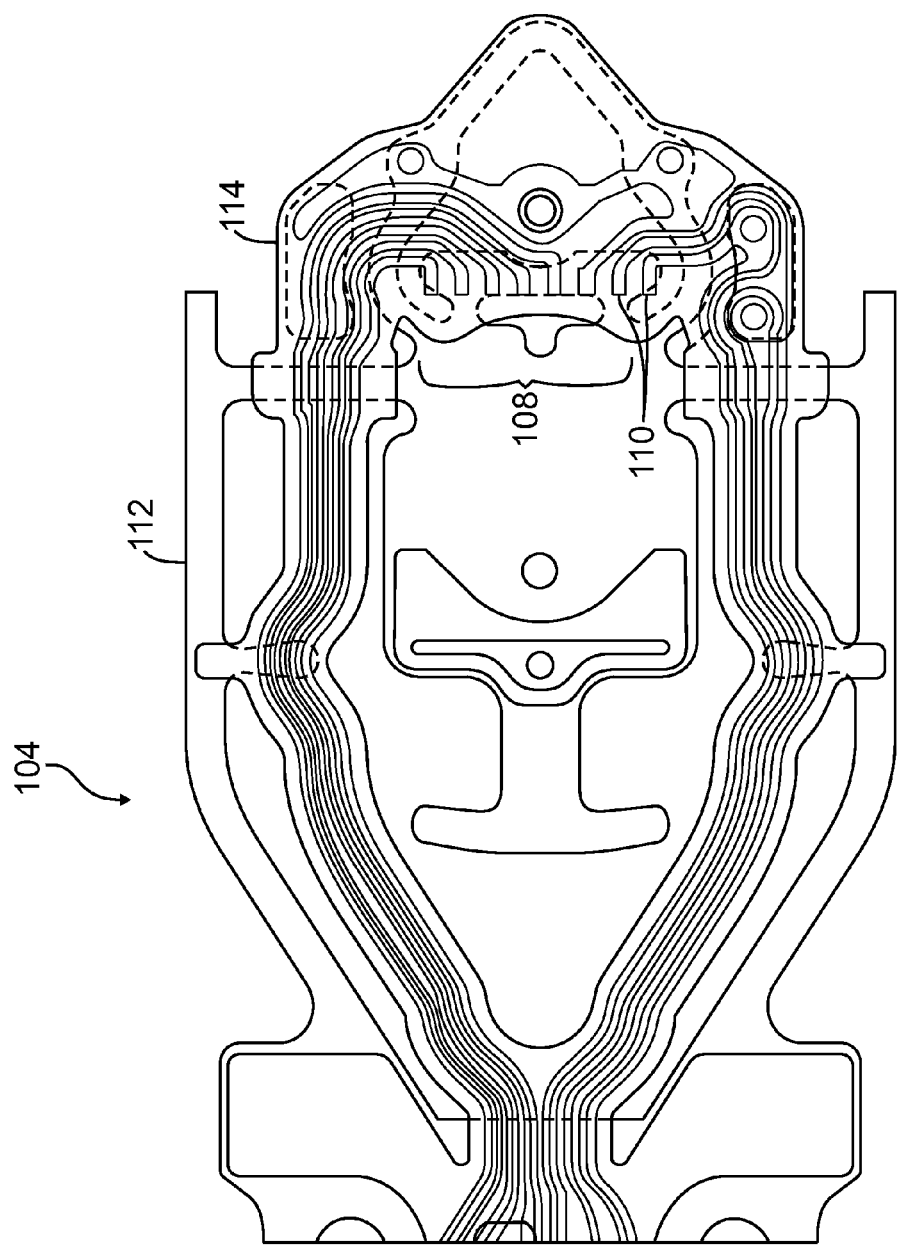
FIG. 2 is a top view of the flexure gimbal area including a solder pad area having several solder pads for coupling signals to a slider in accordance with one embodiment of the invention.

FIG. 2 is a top view of the gimbal area flexure 104 including a solder pad area 108 having several solder pads 110 for coupling signals to a slider in accordance with one embodiment of the invention. The gimbal area flexure or flexure 104 includes a base or bottom metal support layer 112 and a flexible circuit assembly 114 attached to a top surface of the metal support layer 112. The flexible circuit assembly 114 includes the solder pad area 108 and solder pads 110 and provides physical and electrical connections to a slider (not shown). The metal support layer 112 can be made of a thin but suitably strong layer of metal such as stainless steel, or another suitable metal. The flexible circuit assembly 114 includes a first layer of polyimide material, a conductive layer including the solder pad area and conductive traces, and a second layer of polyimide material that can act as a dielectric between the traces on the conductive layer. Further description of the flexible circuit assembly 114 is included in the description of FIG. 4 below.

Figure 3:
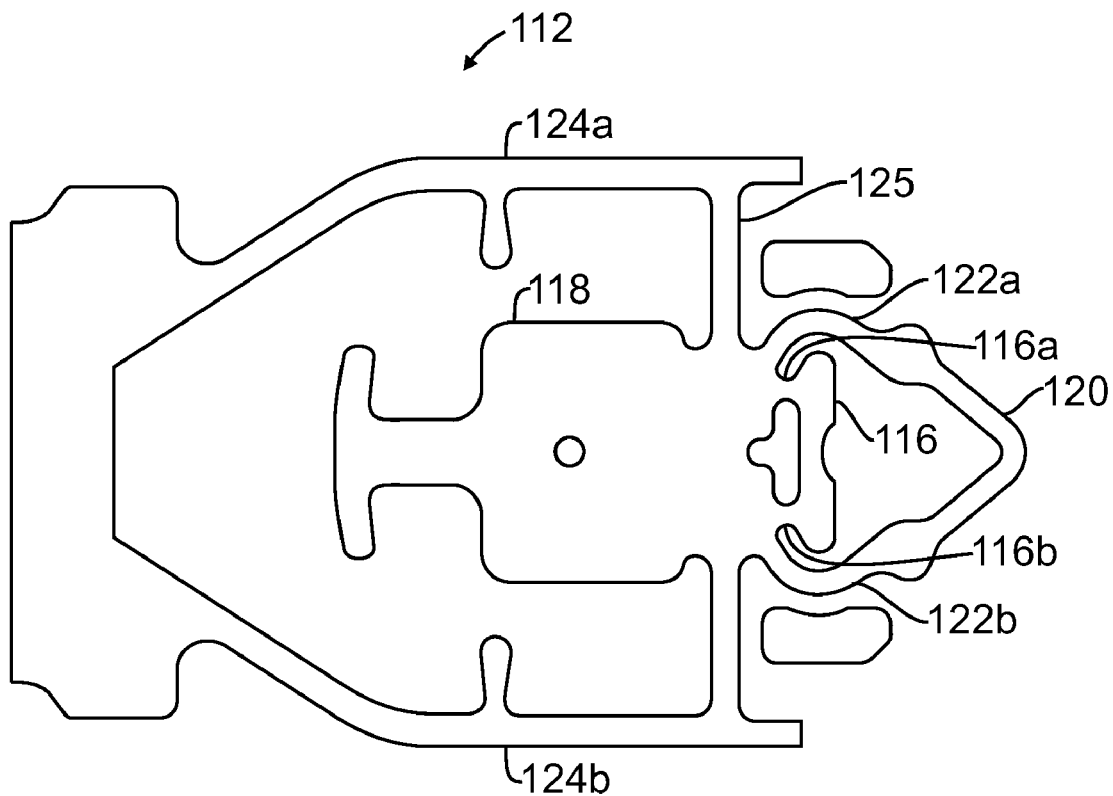
FIG. 3 is a top view of a metal support layer of the gimbal area flexure, where the metal support layer includes a solder pad support and a flexure tongue having a flexure tip formed of two isolation arms coming to a point for minimizing impact forces on the solder pad support in accordance with one embodiment of the invention.

FIG. 3 is a top view of the metal support layer 112 of the gimbal area flexure 104, where the metal support layer 112 includes a solder/bond pad support 116 and a flexure tongue 118 having a flexure tip 120 formed of two isolation arms (122a, 122b) coming to a point for minimizing impact forces on the solder pad support 116 in accordance with one embodiment of the invention. The metal support layer 112 further includes two outrigger beams/arms (124a, 124b) that are spaced apart and a crossbeam 125 disposed across and substantially perpendicular to the outrigger beams (124a, 124b). The crossbeam 125 is positioned along the two outrigger beams (124a, 124b) at about a point that roughly corresponds to the trailing edge of a slider that would be attached to the flexure 104. The crossbeam 125 supports the flexure tongue 118 which is positioned at a central location along the crossbeam 125 and between the outrigger beams (124a, 124b) which are configured to help support the weight of a slider. The solder pad support 116 is configured to add physical support for the solder pad area 108 (see FIG. 2 or FIG. 4) and is laterally supported by two solder pad support arms (116a, 116b) extending from the flexure tongue 118.

The two isolation arms (122a, 122b) each extend away from the flexure tongue 118 at an angle of about 45 degrees with respect to a long axis of the flexure 104. The flexure tongue 118 around the point of attachment of each of the isolation arms (122a, 122b) forms an edge that is roughly perpendicular to a long axis of the respective isolation arm (122a, 122b). The isolation arms (122a, 122b) also form an arrow like shape that comes together at a point (e.g., the flexure tip 120) and has a hollow center section such that each isolation arm consists of a strip of metal having a relatively thin width. As such, when the disk drive experiences substantial non-operational shock from sudden impact or another cause, the isolation arms and flexure tip allow for substantial deflection of the flexure tip 120 with relatively minor impact on, or disturbance of, the adjacent but structurally isolated solder pad support 116.

Figure 4:
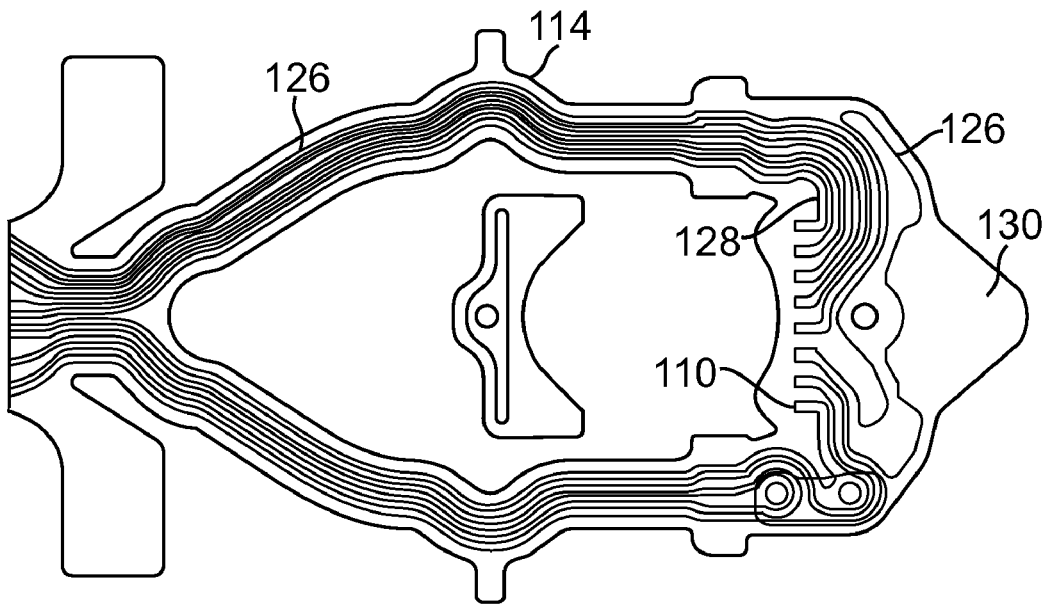
FIG. 4 is a top view of a flexible circuit assembly of the flexure including a base polyimide layer, a metal routing layer having multiple traces extending from slider solder pads, and a dielectric polyimide layer on the metal routing layer in accordance with one embodiment of the invention.

FIG. 4 is a top view of a flexible circuit assembly 114 of the flexure 104 including a base polyimide layer (not visible), a metal routing layer 126 having multiple traces 128 extending from slider solder pads 110, and a dielectric polyimide layer 130 on the metal routing layer 126 in accordance with one embodiment of the invention. During fabrication of the flexure 104, the metal routing layer 126 is formed on the base polyimide layer, and the dielectric polyimide layer 130 is formed on the metal routing layer 126 to electrically isolate traces (e.g., trace 128) of the metal routing layer 126. The flexible circuit assembly 114 includes eight slider bond pads 110 and each one is connected to a corresponding trace (e.g., trace 128).

A majority of the traces enter the slider bond pad at an acute angle relative to a long axis of the flexure 104. More specifically, the angle of several of the traces as they connect to the corresponding pad (e.g., terminal segment before respective solder pad) is about 45 degrees with respect to the long axis of the flexure 104. In other embodiments, this angle can be less than or equal to 90 degrees. The acute angle of the respective terminal segments of the traces can help mitigate and minimize the effects of non-operational shock. At some point in the assembly process for the head gimbal assembly, a slider is secured to the flexible circuit assembly 114 when it is soldered to the slider solder pads 110 (see e.g., FIG. 5).

Figure 5:
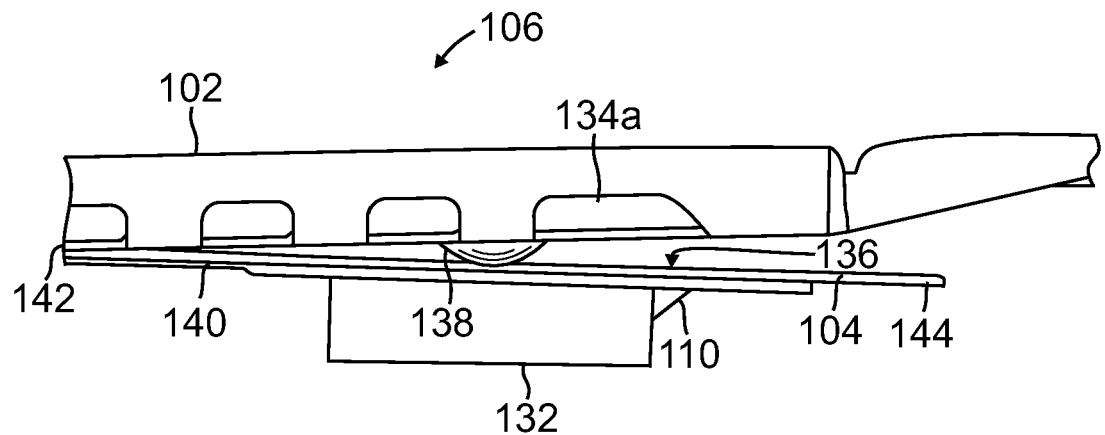
FIG. 5 is a side view of the suspension gimbal area including the flexure attached to the load beam and supporting the slider, where the load beam includes two cut-out sections to allow the gimbal area flexure to roll while minimizing contact between the load beam and a backside area of the slider solder pads in accordance with one embodiment of the invention.

FIG. 5 is a side view of the suspension gimbal area 106 including the flexure 104 attached to the load beam 102 and supporting the slider 132, where the load beam 102 includes two cut-out sections (134a and 134b is visible in FIG. 6) to allow the gimbal area flexure 104 to roll while minimizing contact between the load beam 102 and a backside area 136 of the slider solder pads 110 in accordance with one embodiment of the invention. The load beam 102 includes a protrusion or dimple 138 that extends beyond a bottom surface of the load beam 102 and contacts a bottom surface of the flexure 104 at a point which is about central to a slider backside area. The dimple 138 positioned central to and opposite of the slider 132 enables the slider 132 to twist or roll (e.g., like an airplane) along a long axis of the load beam 102, where the dimple 138 acts as a pivot point for the gimbal area flexure 104. The leading end 140 of the gimbal area flexure 104 is attached along the load beam 102 at a junction point 142 that is closer to the main body of the load beam 102 than the dimple 138. The trailing end 144 of the gimbal area flexure 104 is unattached and therefore free to move within the constraints of motion caused by the structure of the flexure 104 and the attachment of the flexure 104 to the load beam 102 at junction point 142.

Figure 6:
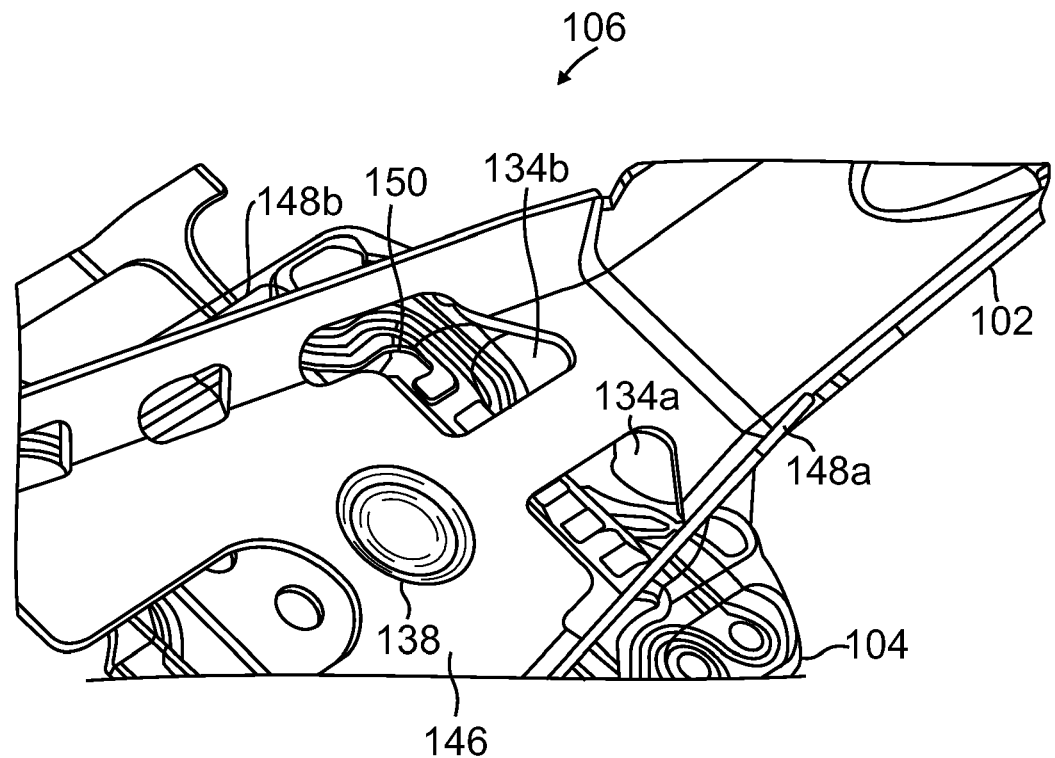
FIG. 6 is a perspective view of the suspension gimbal area of FIG. 5, including the two cut-out sections of the load beam that allow the gimbal area flexure to roll while minimizing contact between the load beam and the backside area of the slider solder pads in accordance with one embodiment of the invention.

FIG. 6 is a perspective view of the suspension gimbal area 106 of FIG. 5, including the two cut-out sections (134a, 134b) of the load beam 102 that allow the gimbal area flexure 104 to roll while minimizing contact between the load beam 102 and the backside area of the slider solder pads 136 in accordance with one embodiment of the invention. The load beam 102 includes a long and substantially planar body 146 and supporting side walls (148a, 148b) positioned along lateral edges of the planar body 146. The two cut-out sections (134a, 134b) are roughly symmetric and each is positioned both in the planar body 146 and the supporting side walls (148a, 148b) thereby forming a continuous opening. Along the planar body 146, the two cut-out sections (134a, 134b) are separated by a center support beam 150 that extends along the long axis of the load beam 102 near a laterally central area of the load beam 102.

The position of each of the two cut-out sections (134a, 134b) along the load beam 102 corresponds to a position of the backside 136 of the solder pad area such that as the gimbal area flexure 104 and slider 132 roll (e.g., twist along the long axis of the load beam 102), the solder pad backside 136 does not make contact with the load beam 102. In such case, during slider roll, contact between the backside of the flexure 104 and load beam 102 can occur at a location along the flexure 104 other than the solder pad backside 136. During a non-operation shock event, some contact between the solder pad backside 136 and the center beam 150 may occur. However, such contact can be limited to just a few of the solder pads positioned in a central region of the solder pad area and therefore may not result in joint damage.

Figure 7:
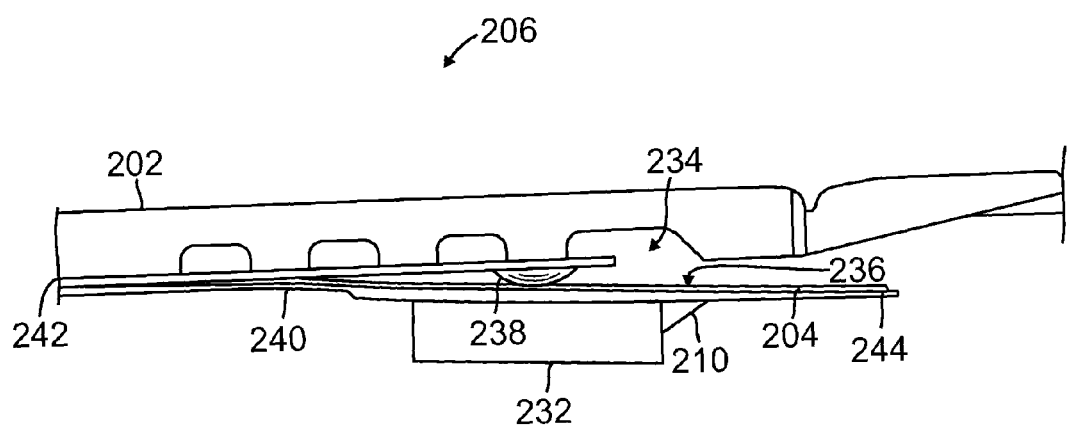
FIG. 7 is a side view of a suspension gimbal area including a flexure attached to an alternative load beam and supporting the slider, where the alternative load beam includes a single cut-out section extending across the lateral width of the load beam to allow the gimbal area flexure to roll while substantially preventing contact between the load beam and a backside area of the slider solder pads in accordance with one embodiment of the invention.

FIG. 7 is a side view of a suspension gimbal area 206 including a flexure 204 attached to an alternative load beam 202 and supporting a slider 232, where the alternative load beam 202 includes a single cut-out section 234 extending across the lateral width of the load beam 202 to allow the gimbal area flexure 204 to roll while substantially preventing contact between the load beam 202 and a backside area 236 of the slider solder pads in accordance with one embodiment of the invention. Similar to the embodiment of FIG. 5, the load beam 202 includes a protrusion or dimple 238 that extends beyond a bottom surface of the load beam 202 and contacts a bottom surface of the flexure 204 at a point which is about central to a solder backside area.

The dimple 238 positioned central to and opposite of the slider 232 enables the slider 232 to twist or roll (e.g., like an airplane) along a long axis of the load beam 202, where the dimple 238 acts as a pivot point for the gimbal area flexure 204. The leading end 240 of the gimbal area flexure 204 is attached along the load beam 202 at a junction point 242 that is closer to the main body of the load beam 202 than the dimple 238. The trailing end 244 of the gimbal area flexure 204 is unattached and therefore free to move within the constraints of motion caused by the structure of the flexure 204 and the attachment of the flexure 204 to the load beam 202 at junction point 242.

Figure 8:
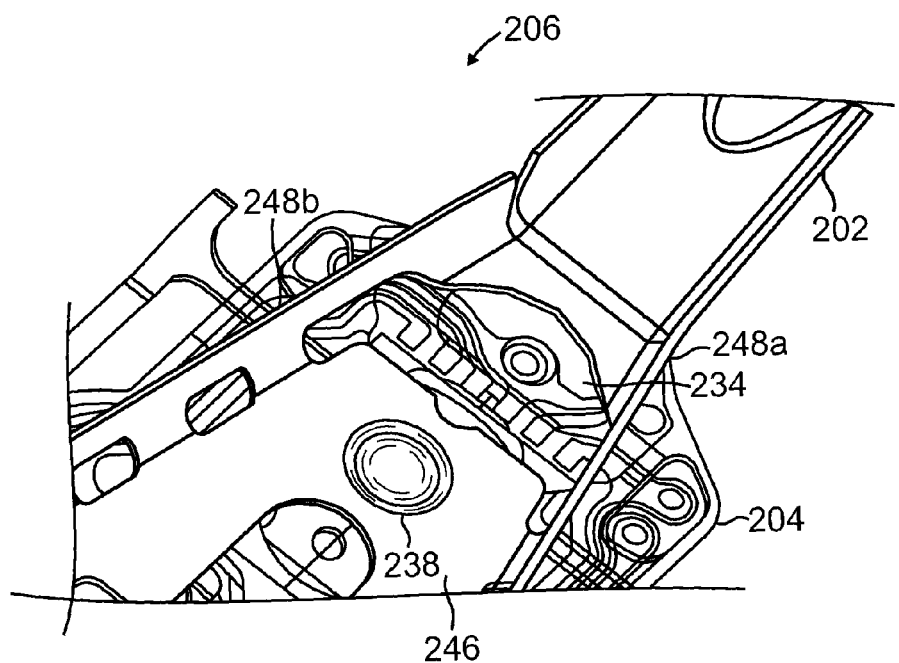
FIG. 8 is a perspective view of the suspension gimbal area of FIG. 7, including the single cut-out section of the load beam that allows the gimbal area flexure to roll while substantially preventing contact between the load beam and the backside area of the slider solder pads in accordance with one embodiment of the invention.

FIG. 8 is a perspective view of the suspension gimbal area 206 of FIG. 7, including the single cut-out section 234 of the load beam 202 that allows the gimbal area flexure 204 to roll while substantially preventing contact between the load beam 202 and the backside area 236 of the slider solder pads in accordance with one embodiment of the invention. The load beam 202 includes a long and substantially planar body 246 and supporting side walls (248a, 248b) positioned along lateral edges of the planar body 246. The single cut-out section 234 extends in both the planar body 246 and the supporting side walls (248a, 248b). The single cut-out section 234 also extends along the entire lateral width of the planar body 246.

The position of the cut-out section 234 along the load beam 202 corresponds to a position of the solder pad backside 236 such that as the gimbal area flexure 204 and slider 232 roll (e.g., twist along the long axis of the load beam 202), the solder pad backside 236 does not make contact with the load beam 202. In such case, during slider roll, contact between the backside of the flexure 204 and load beam 202 will occur at a location along the flexure 204 other than the solder pad backside 236. In addition, during a non-operation shock event, no contact between the solder pad backside 236 and the load beam 202 should occur as the flexure tip 244 or another area of the flexure should make contact with the load beam 202. In this way, the cut-out section 234 of the load beam 202 should provide about 100 percent clearance of the solder pad backside 236 from the load beam 202.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A suspension assembly for a magnetic read/write head of a storage device, the suspension assembly comprising:
   a flexure comprising:
      a gimbal area comprising a leading end and a trailing end;
      a metal support layer in the gimbal area, the metal support layer comprising:
         a flexure tongue;
         a flexure tip disposed at the trailing end and comprising first and second isolation arms extending from the flexure tongue; and
         a bond pad support section comprising at least one support arm extending from the flexure tongue; and
   a load beam comprising an elongated flat surface having a protrusion extending therefrom and having at least one cut-out section,
   wherein the leading end of the gimbal area of the flexure is attached along the elongated flat surface of the load beam,
   wherein the flexure is configured to retain contact with the protrusion, and
   wherein the at least one cut-out section is configured to receive a portion of the bond pad support section when the flexure rotates about a long axis of the suspension assembly.

2. The suspension assembly of claim 1, further comprising:
   a first polyimide layer on a first side of the metal support layer;

a metal routing layer on the first polyimide layer, the metal routing layer comprising a bond pad area for coupling to the read/write head; and a second polyimide layer on the metal routing layer, wherein the bond pad area comprises a plurality of rectangular pads, and wherein the metal routing layer comprises a trace coupled to a first pad of the plurality of pads, wherein the trace comprises a rectangular terminal segment extending from the first pad and positioned such that a long axis of the terminal segment is at an acute angle relative to a long axis of the first pad.

3. The suspension assembly of claim 1, further comprising:

a first polyimide layer on a first side of the metal support layer;

a metal routing layer on the first polyimide layer, the metal routing layer comprising a bond pad area for coupling to the read/write head; and a second polyimide layer on the metal routing layer, wherein the bond pad area comprises a plurality of rectangular pads, wherein the metal routing layer comprises a plurality of traces, wherein each trace of the plurality of traces is coupled to one pad of the plurality of pads, and wherein each of at least half of the plurality of traces comprises a rectangular terminal segment extending from a first pad of the plurality of pads and positioned such that a long axis of the terminal segment is at an acute angle relative to a long axis of the first pad.

4. The suspension assembly of claim 1:

wherein the load beam comprises two elongated side walls positioned along lateral edges of the elongated flat surface, and wherein the at least one cut-out section comprises first and second cut-out portions on either side of a center beam disposed along the elongated flat surface.

5. The suspension assembly of claim 4, wherein the first and second cut-out portions comprise cut-outs in the elongated flat surface and the side walls.

6. The suspension assembly of claim 5, wherein the at least one cut-out section is configured to minimize contact of the bond pad support section and the load beam.

7. The suspension assembly of claim 1:

wherein the load beam comprises two elongated side walls positioned along lateral edges of the elongated flat surface, and wherein the at least one cut-out section comprises a cut-out portion extending the lateral length of the elongated flat surface.

8. The suspension assembly of claim 7, wherein the cut-out portion extends into at least a portion of each of the elongated side walls of the load beam.

9. The suspension assembly of claim 8, wherein the at least one cut-out section is configured to prevent contact of the bond pad support section and the load beam.

10. The suspension assembly of claim 1, wherein, during substantial rotation of the flexure, a point along the flexure contacts the load beam, wherein the point is located on a second side of the metal support layer opposite to the first side, wherein the point is not located within the bond pad support section of the metal support layer.

11. The suspension assembly of claim 1, wherein the isolation arms extend to a common point.

12. The suspension assembly of claim 11, wherein the isolation arms extend from the flexure tongue at a preselected angle with respect to the long axis of the suspension assembly, wherein the preselected angle is less than, or equal to, 90 degrees.

13. The suspension assembly of claim 1, wherein the at least one support arm is spaced apart from the isolation arms.

14. The suspension assembly of claim 1, wherein the at least one support arm comprises a first support arm and a second support arm.

15. The suspension assembly of claim 14:

wherein the bond pad support section comprises a body that is about rectangular;

wherein the first support arm is positioned proximate to a first end of the rectangular body, wherein the second support arm is positioned proximate to a second end, opposite to the first end, of the rectangular body.

16. The suspension assembly of claim 1, wherein the metal support layer further comprises:

two outrigger beams; and a crossbeam disposed between the two outrigger beams, wherein the flexure tongue is disposed at about a central position along the crossbeam.

17. The suspension assembly of claim 1, wherein the metal support layer comprises stainless steel, and the metal routing layer comprises copper.

* * * * *